United States Patent [19]

Kakiuchi et al.

[11] Patent Number: 5,755,628
[45] Date of Patent: May 26, 1998

[54] THREAD-WOUND GOLF BALL AND A METHOD FOR MANUFACTURING THE SAME

[75] Inventors: Shinichi Kakiuchi; Junji Umezawa, both of Saitama, Japan

[73] Assignee: Bridgestone Sports Co., Ltd., Tokyo, Japan

[21] Appl. No.: 672,256

[22] Filed: Jun. 26, 1996

[30] Foreign Application Priority Data

Jun. 28, 1995 [JP] Japan ................................. 7-184666

[51] Int. Cl.⁶ .......................... A63B 37/06; A63B 37/08
[52] U.S. Cl. ...................... 473/354; 473/357; 473/361
[58] Field of Search .......................... 473/357, 358, 473/359, 360, 361, 362, 363, 364, 354, 356

[56] References Cited

U.S. PATENT DOCUMENTS 726,502  4/1903  Browning et al. .................. 473/363

*Primary Examiner*—George J. Marlo
*Attorney, Agent, or Firm*—Sughrue, Mion, Zinn, Macpeak & Seas, PLLC

[57] ABSTRACT

A thread-wound golf ball manufactured by concurrently winding a pair of rubber threads spaced 1-7 mm apart from each other on a core to form a wound core, which is then enclosed with a covering material. The covering material reliably penetrates into a rubber thread layer, thereby achieving an improved bonding strength between the covering material and the rubber thread layer. Durability of the golf ball is enhanced and the time period required for winding threads is considerably reduced, resulting in an improved productivity.

19 Claims, 4 Drawing Sheets

THREAD-WOUND GOLF BALL AND A METHOD FOR MANUFACTURING THE SAME

BACKGROUND OF THE INVENTION

1. Field of the Invention

The present invention relates to a thread-wound golf ball wherein a wound core formed by winding a rubber thread around a core is enclosed with a cover. It also relates to a method for manufacturing the same.

2. Related Art

Thread-wound golf balls are manufactured by winding a rubber thread on a solid core or a liquid core to form a wound core and then enclosing the wound core with a cover. Professional or advanced golf players prefer thread-wound golf balls because of their softer feeling upon club contact and better spinning performance compared with two-piece golf balls. Thread-wound golf balls, however, have a drawback in that their covers are likely to break or rupture upon club contact, resulting in inferior durability compared with two-piece golf balls.

One of factors determining the durability of thread-wound golf balls is the bond between a covering material and a rubber thread layer. Poor bond causes a higher likelihood of a broken cover and a deformed ball after repeated hitting. Various studies have been conducted regarding reliable penetration of a covering material into a rubber thread layer to improve the bond therebetween. For example, Japanese publication No. JP-A-2-126871 proposes a method for selecting the crossing angle between two consecutive rubber thread orbits or turns around a core being substantially within a range of 12 to 45 degrees.

Also, thread-wound golf balls have a problem of poorer productivity compared with two-piece golf balls for the following reason. The production of two-piece balls substantially involves only the steps of preparing a solid core and enclosing the solid core with a cover, whereas the production of thread-wound golf balls involves more steps; preparing a core, winding a rubber thread around the core to form a wound core, and enclosing the wound core with a cover. In addition, the step of winding a rubber thread around a core takes a long time.

For improving the productivity of thread-wound golf balls, reducing the time period required for winding a rubber thread is essential. Conceivable techniques for accelerating the thread-winding process include: (1) increasing the winding speed of a thread winder; (2) increasing the breadth of a rubber thread; and (3) increasing the thickness of a rubber thread. These means, however, raise problems as described below.

Techniques (1) causes higher likelihood of a broken rubber thread because a large abrupt force is applied to a rubber thread at the beginning of winding, and larger variations in wound thread tightness in which the wound thread tightness varies from portion to portion of a wound core. Techniques (2) degrades the sphericity of a wound core, and consequently to cause the cover thickness vary from portion to portion of a golf ball. This results in variations in the impact resilience of a ball depending on the portion on which the ball is hit. Further, although the winding density of a rubber thread layer increases, voids in the rubber thread layer decrease in size. This causes lesser penetration of a covering material into the rubber thread layer, resulting in a degraded durability. Techniques (3) causes the winding density of the rubber thread layer to decrease, resulting in a decreased impact resilience.

As described above, improved durability and improved productivity are required of thread-wound golf balls. To meet these requirements, it is important to improve the bond between a covering material and a rubber thread layer and to reduce the time period required for thread winding. The bond between a covering material and a rubber thread layer can be increased by selecting an optimum winding density of the rubber thread layer for the fluidity of the covering material to thereby obtain for reliable penetration of the covering material into voids of the rubber thread layer. Also, the deterioration and variations in impact resilience can be prevented by uniformly winding a rubber thread around a core and improving the sphericity of the resultant wound core.

The publication as mentioned above proposes means for improving durability by improving the orbit of winding a rubber thread on a core. However, the publication does not mention means for improving the manner of winding a rubber thread on a core to thereby improve both durability and productivity of thread-wound golf balls.

SUMMARY OF THE INVENTION

In view of the foregoing, an object of the present invention is to provide a thread-wound golf ball wherein the step for winding a rubber thread around a core is improved for increasing the bonding strength between a covering material and a rubber thread layer to thereby improve the durability thereof, while reducing the time period required for thread winding to thereby improve the productivity thereof.

Another object of the present invention is to provide a method for manufacturing the golf ball as described above.

To achieve the above objects, the inventors carried out earnest studies and found that when two rubber threads spaced 1–7 mm apart from each other are concurrently wound on a core, the density of the resultant rubber thread layer becomes appropriate for reliable penetration of a covering material into voids in the rubber thread layer, resulting in a higher bonding strength between the rubber thread layer and the cover to improve the durability of the thread-wound golf ball, while the time period required for thread winding is reduced to thereby improve the productivity of the thread-wound golf balls. It was further found that no deterioration or variations in impact resilience occur. The present invention is accomplished based on these findings.

The present invention provides a thread-wound golf ball comprising a core, a pair of rubber threads wound around said core, spacing between said pair of rubber threads being in a range between 1 and 7 mm, and a cover enclosing said pair of rubber threads and said core.

A thread-wound golf ball of the present invention has an excellent durability and provides a higher productivity.

The above and other objects, features and advantages of the present invention will be more apparent from the following description.

PREFERRED EMBODIMENTS OF THE INVENTION

The present invention will now be described in detail with reference to the accompanying drawings.

Figure 1:
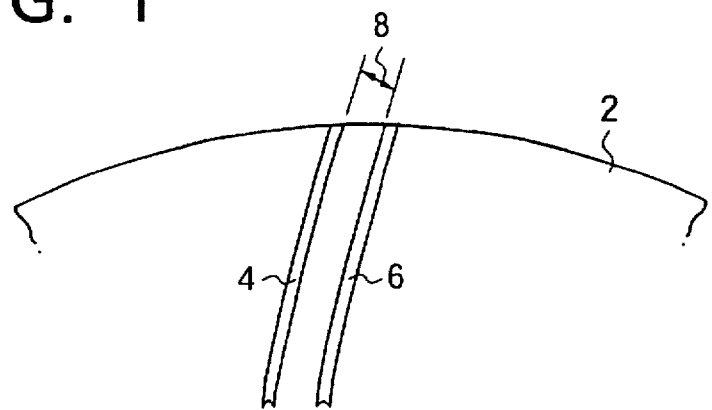
FIG. 1 is a schematic partial side view a thread-wound golf ball according to an embodiment of the present invention during a step of winding threads.
Figure 6:
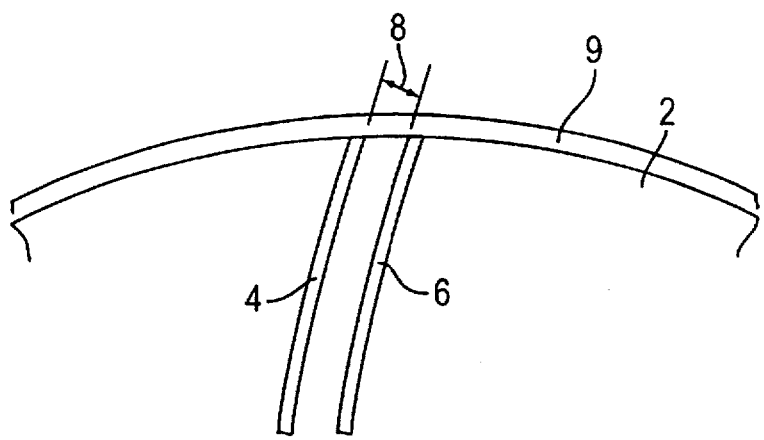
FIG. 6 is a schematic partial view of a thread-wound golf ball illustrating the completed golf ball.

Referring to FIG. 1, in a step of manufacturing a thread-wound golf ball according to an embodiment of the invention, a pair of rubber threads 4 and 6 are wound on a core 2 at the same time to form a wound core. The spacing between the two rubber threads 4 and 6 are 1–7 mm. If the spacing 8 is smaller than 1 mm, the covering material fails to reliably penetrate into a rubber thread layer, resulting in an unsatisfactory durability. In contrast, if the spacing 8 is greater than 7 mm, rubber threads are likely to come off the core surface upon starting to wind rubber threads, especially for small core diameters, resulting in a failure to wind rubber threads on the core. The spacing 8 is preferably 1–5 mm, more preferably 2–4 mm. The completed golf ball is illustrated in FIG. 6 with the cover 9.

There is no substantial restriction on the types of cores on which the rubber threads are to be wound. Cores may be solid spherical cores made of synthetic rubber, or liquid cores, i.e., spherical rubber bags containing liquid. The outside diameter of the core is typically 26–36 mm.

Also, there is no substantial restriction on materials for the rubber threads. For example, a vulcanizing agent, a vulcanization-accelerator, a vulcanization-promoter, an antioxidant, a filler, a softener, and the like may be added to base rubber such as natural rubber, isoprene rubber or their blend to prepare a rubber composition. After vulcanization, the rubber composition is formed into a sheet, which is then cut into rubber threads. Alternatively, latex of the rubber composition may be solidified to form a sheet, which is then vulcanized and cut into rubber threads.

The rubber thread is preferably 1.0–2.5 mm wide and 0.3–0.6 mm thick before being wound on a core. If the width of the rubber thread is less than 1.0 mm or the thickness thereof is less than 0.3 mm, the strength of the rubber thread will be excessively low, causing an increased possibility of breakage of the rubber thread during a winding process. This may cause the working performance and the quality of the golf ball to decrease. If the width is greater than 2.5 mm or the thickness is greater than 0.6 mm, the sphericity of a wound core may be deteriorated, causing variations in cover thickness. This may result in poorer impact resilience for some portions of the golf ball.

The density of the rubber thread layer in the final state of the rubber threads is preferably 0.76–0.92 g/cm³ for better penetration of the covering material into the rubber thread layer. The expansion ratio of the rubber threads in the final state of the rubber threads is preferably 7–9 times and the thickness of the rubber thread layer is preferably 3–7 mm.

There is no substantial restriction on the method for winding the rubber threads on the core. Examples of available methods include a random winding (basket winding) technique and a great circle winding technique. The random winding technique is particularly advantageous for formation of more voids in a rubber thread layer because a large amount of the covering material can penetrate to the rubber thread layer.

Figure 4:
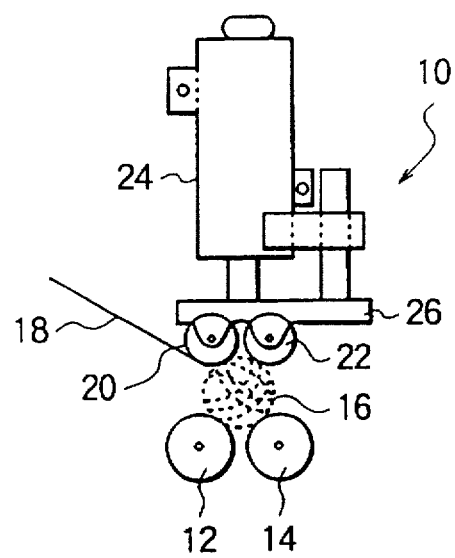
FIG. 4 is a front view of an example of the thread winder of FIG. 2 using a random winding technique.

The random winding technique is carried out, for example, using an apparatus shown in FIG. 4 (refer to Patent Publication Nos. JP-A-60-15363 and JP-A-60-15364). In a thread winder 10 of FIG. 4, a pair of drive rollers 12 and 14 rotate to rotate a core 16 while both rollers 12 and 14 alternatively move back and forth reciprocally in an axial direction, thereby winding rubber threads 18 on the core 16 via holding rollers 20 and 22 mounted on a support 26.

In this case, a pneumatic cylinder 24 is periodically actuated to reduce the pressing force of the holding rollers 20 and 22 against the core 16, thereby making the core 16 free from the driving rollers 12 and 14. This allows the core 16 to spontaneously move such that the rubber threads 18 are wound at the portions where the number of turns of the rubber threads 18 is low at the present. In this way, the rubber threads 18 are eventually wound in an overall spherical shape.

Figure 5A:
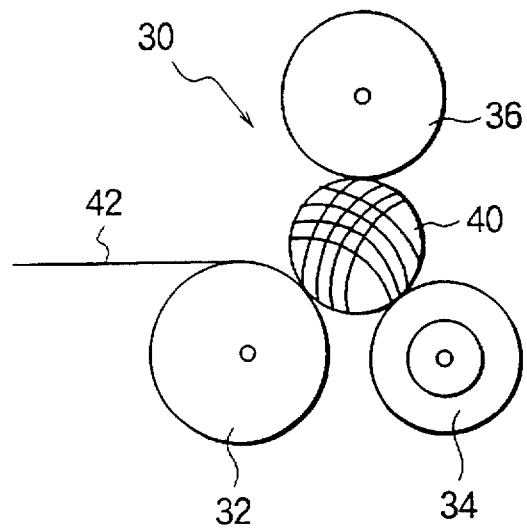
FIG. 5A is a front view of an example of the thread winder of FIG. 2 using a great circle winding technique.
Figure 5B:
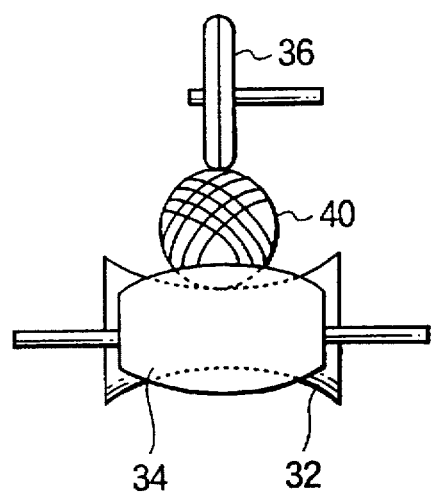
FIG. 5B is a side view of the thread winder of FIG. 5A.

The great circle winding may be carried out, for example, using an apparatus shown in FIG. 5 (Patent Publication No. JP-B-2-20543). In a thread winder 30 of FIG. 5, a drive roller 32 having an hour-glass shape, an idle roller 34 having a barrel shape, and a holding roller 36 for holding the idle roller 34 are arranged at apexes of a triangle for supporting a core 40. The drive roller 32 rotates the core 40 to wind a rubber threads 42 on the core 40 through the driving roller 32.

Since only the drive roller 32 imparts rotation to the core 40, the rubber threads 42 are wound around the core 40 along its great circle. Because of the configuration and arrangement of the rollers, every turn of the rubber threads 42 has its orbit slightly apart from the previous orbit in its angle. As a consequence, the rubber threads 42 are wound on the core 40 along orbits diverting in a shape of a sector.

During manufacture of the thread-wound golf balls of the present invention by carrying out a random winding or great circle winding technique, two guide grooves spaced 1–7 mm apart from each other may be formed in a member such as the holding roller 36 in the winder of FIG. 5, or, the drive rollers 12 and 14 in the winder of FIG. 4 through which a pair of rubber threads to be wound on the core are fed. Two rubber threads run through the corresponding two guide grooves.

In the present invention, the crossing angle between the orbits of two consecutive rubber thread turns is preferably within a range of 20–35 degrees. This enhances the bonding strength between the rubber thread layer and the covering material, resulting in improved durability of the golf ball.

Also, the present invention encompasses three or more rubber threads concurrently wound on a core. Three or more rubber threads can be concurrently wound by concurrently winding two or more pairs of rubber threads. Rubber threads must also be spaced 1–7 mm apart from one another.

The thread-wound golf ball of the present invention is obtained by press molding or injection molding a single- or multiple-layer cover on a wound core prepared in the way as described above, and subsequently forming dimples on the cover. The materials and types of the cover, the diameter and weight of the wound core and the finished golf ball are arbitrarily selected. For example, the cover may be of a single- or multiple-layer made of ionomer resin, balata or the like. Thread-wound golf balls, however, should comply with the Rules of Golf regarding size and weight, and typically have a diameter of not less than 42.67 mm and a weight of not more than 45.92 g. The hardness of the ball is preferably such that a compression of 2.6–3.6 mm results at a load of 100 kg to obtain better feeling of shot, impact resilience, and durability.

EXAMPLES AND COMPARATIVE EXAMPLES

The embodiments of the present invention will now be described in more detail with reference to the accompanying drawings. Thread-wound golf balls were manufactured using solid cores (A and B), rubber threads (X, Y, and Z), and a cover described below. The hardness of the solid core given below is in terms of the compression of the solid core at a load of 30 kg (i.e. amount of deformation at a load of 30 kg), considering the compression of the solid core as 0 mm at an initial load of 1 kg applied thereto. "HIMILAN" is a trade name of an ionomer resin of DuPont Mitsui Polychemicals Co., Ltd.

| Solid core A | |
|---|---|
| Composition (parts by weight) | |
| Polybutadiene rubber | 100 |
| Zinc acrylate | 10 |
| Zinc flower | 10 |
| Barium sulfate | 61 |
| Stearic acid | 1 |
| Dicumylperoxide | 1.2 |
| Parameters | |
| Diameter (mm) | 31.5 |
| Weight (g) | 23.1 |
| Hardness (mm) | 3.1 |
| Solid core B | |
| Composition (parts by weight) | |
| Polybutadiene rubber | 100 |
| Zinc acrylate | 10 |
| Zinc flower | 30 |
| Barium sulfate | 78 |
| Stearic acid | 1 |
| Dicumylperoxide | 1.2 |
| Parameters | |
| Diameter (mm) | 28.0 |
| Weight (g) | 17.8 |
| Hardness (mm) | 2.9 |
| Rubber thread X | |
| Composition (parts by weight) | |
| Polyisoprene rubber | 70 |
| Natural rubber | 30 |
| Zinc flower | 1.5 |
| Stearic acid | 1.0 |
| Vulcanization-accelerator | 1.5 |
| Sulfur | 1.0 |
| Dimensions | |
| Breadth (mm) | 1.6 |
| Thickness (mm) | 0.55 |
| Rubber thread Y | |
| Composition (parts by weight) | |
| Same as rubber thread X | |
| Dimensions | |
| Breadth (mm) | 1.6 |
| Thickness (mm) | 0.45 |
| Rubber thread Z | |
| Composition (parts by weight) | |
| Same as rubber thread X | |

-continued

| Dimensions | |
|---|---|
| Breadth (mm) | 1.0 |
| Thickness (mm) | 0.45 |
| Cover | |
| Composition (parts by weight) | |
| HIMILAN 1605 | 50 |
| HIMILAN 1706 | 50 |
| TiO2, pigment and dispersing agent | As needed |
| Parameters | |
| Shore D hardness | 64 |
| Specific gravity | 0.97 |

Figure 2:
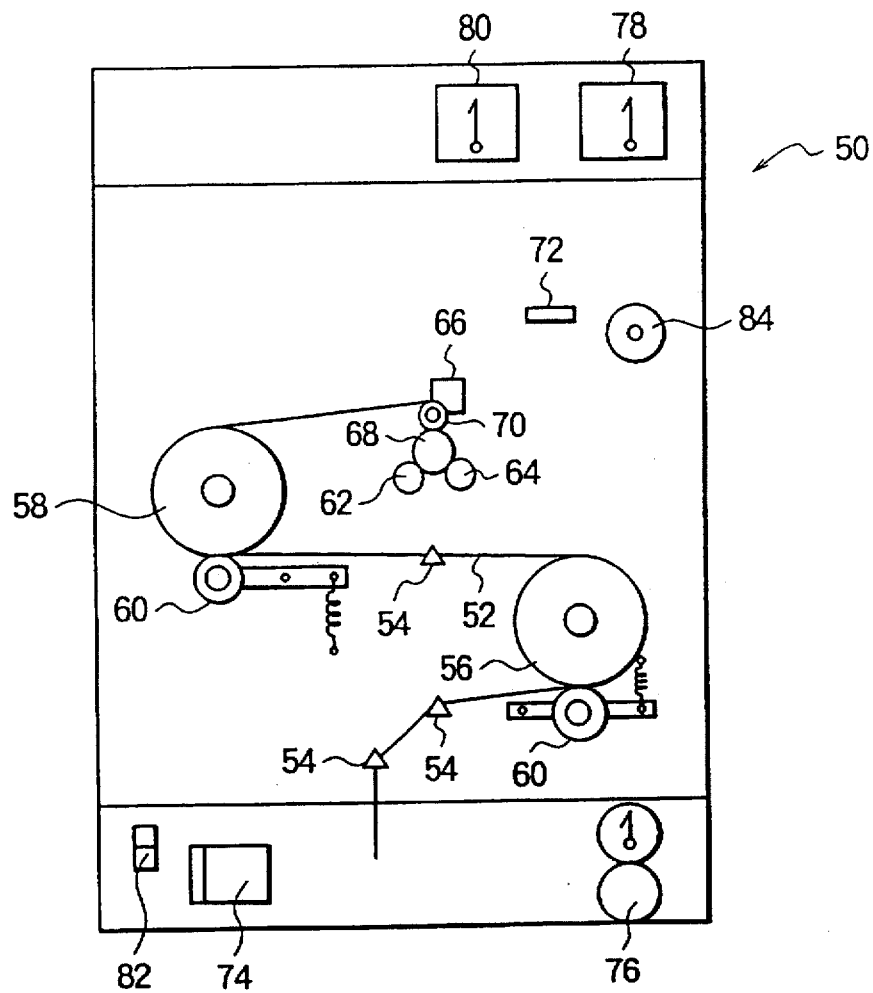
FIG. 2 is a schematic side view of a thread winder used for manufacturing the golf ball according to embodiments of the present invention.

The solid cores were formed by a heat treatment and a subsequent vulcanization of the rubber compositions as prepared above. The rubber threads were obtained by forming the rubber compositions as prepared above into sheets and by subsequent heat treatment, vulcanization and cutting of the sheets. The thread winder as shown in FIG. 2 was used for winding rubber threads on a core. The types, number, and spacing of rubber threads used therein were as listed in Tables 1 to 3. The thus obtained wound cores were enclosed with the covering material by press molding while heating at a temperature of 145° C. for 4 minutes and 30 seconds. In this way, completed were golf balls according to first through seventh examples and first through sixth comparative examples shown in Tables 1 to 3.

FIG. 2 shows a thread winder 50 for carrying out the random winding technique described above. The thread winder 50 comprises rubber threads 52, a rubber thread guide 54 for the rubber threads 52, a first brake roller 56, a second brake roller 58, pressing rollers 60 for pressing the rubber threads 52 against the first and second brake rollers 56 and 58 so as to prevent the rubber threads 52 from slipping, take-up rollers 62, 64 and 66, a holding idle roller 70 for pressing the take-up roller 66 against a core 68, a diameter meter 72 for measuring the final diameter for detecting the completion of winding, a rotational speed control panel 74 for setting the rotational speed of the take-up rollers 62 and 64, a dial 76 for adjusting the pressing force of the holding roller 70, dials 78 and 80 for adjusting the rotational resistance of the first and second brake rollers 56 and 58, a main power supply 82, and a start switch 84 for starting the thread winder 50.

In the thread winder 50, the three take-up rollers 62, 64 and 66 are arranged to support the core 68. The upper take-up roller 66 presses the core 68 against the lower take-up rollers 62 and 64 for holding the core 68. The take-up rollers 62 and 64 are rotated to impart high-speed rotation to the core 68. The rubber threads 52 are continuously fed to the rotating core 68 through the first and second brake rollers 56 and 58 and wound on the core 68 thereby forming a wound core. As a result of the core 68 rotating and taking up the rubber threads 52, the first and second brake rollers 56 and 58 rotate.

Hence, by adjusting both brake rollers 56 and 58 at an appropriate rotational torque, a predetermined tension is given to the rubber threads 52 extending between the brake rollers 56 and 58 to expand the rubber threads 52. In this case, the brake force or rotational resistance supplied to the second brake roller 58 gives a predetermined tension to the rubber threads 52 extending between the second brake roller 58 and the core 68, thereby expanding the rubber threads 52 to a predetermined expansion ratio. Thus expanded rubber threads 52 run through wedge-shaped guide grooves 90 formed in the holding roller 70 and then are wound on the core 68.

Figure 3A:
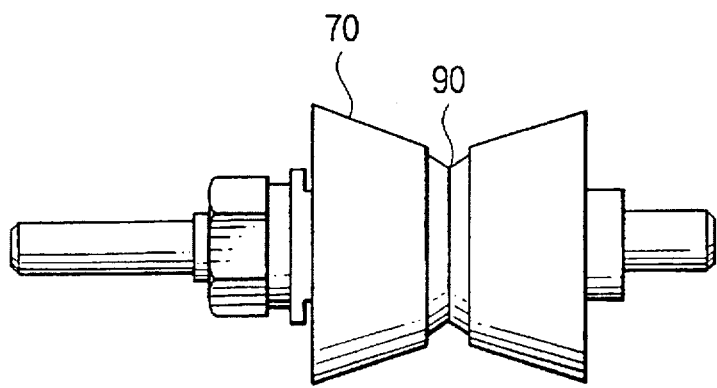
FIG. 3A and 3B are enlarged side views of a conventional holding roller and the holding roller of the thread winder of FIG. 2.
Figure 3B:
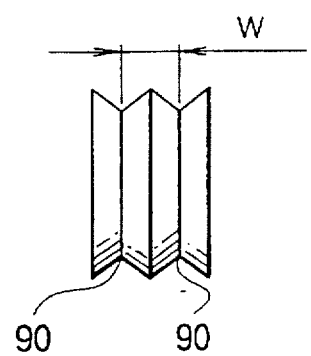

In the comparative examples where one rubber thread or two rubber threads having no spacing therebetween were wound on a core, the holding roller 70 having one guide groove 90 (FIG. 3A) was used for guiding a rubber thread. In order to wind concurrently two rubber threads having a predetermined spacing therebetween on the core, the holding roller 70 having two guide grooves 90 as shown in FIG. 3B was used for guiding the rubber threads. The spacing W used between the bottoms of the guide grooves 90 was 2.0 mm, 3.0 mm, or 5.0 mm.

In the thread-wound golf balls according to the first through seventh examples and the first through sixth comparative examples, the crossing angle between the orbits of two consecutive rubber thread turns was selected to be within a range of 20–35 degrees.

Tables 1 to 3 show properties of wound cores as described above and golf balls produced therefrom. Tables 1 to 3 also show a normalized time period each required for winding a rubber thread(s) on a core. In Tables 1 and 2, the normalized time period for the thread winding is represented, with the base time period for the first comparative example being 100. In Table 3, the normalized time period for thread winding is represented, with the base time period for the fifth comparative example being 100. The normalized time periods are presented independently between Tables 1 and 2, and 3. The sphericities of the wound cores in Tables 1 to 3 are represented in terms of the difference between maximum and minimum measurements from 15 measurements of the diameter of the wound core. The hardness of the thread-wound golf ball is expressed in terms of the compression in mm of the golf ball subjected to at a load of 100 kg (i.e. amount of deformation at a load of 100 kg), with compression of the ball being 0 mm at an initial load of 1 kg.

Thread-wound golf balls according to the examples and the comparative examples were evaluated for impact resilience and durability in the manner described below. Results of the evaluation are shown in Tables 1 to 3.

[Impact Resilience]

Balls were hit with a driver at a head speed of 45 m/s by using a hitting test machine to measure their initial speed.

[Durability]

10 balls according to each sample were hit 200 times each with a driver at a head speed of 45 m/s by using the hitting test machine. After the hitting test, balls having no cracks were counted. The durability of each golf ball is represented by way of normalized number, with the base number of balls bearing no cracks in the first comparative example being 100 in Tables 1 and 2, and that in the fifth comparative example being 100 in Table 3. Also, each ball was repeatedly hit with a driver at a head speed of 45 m/s by using a hitting test machine so as to count the number of hits before the ball cracked. In Tables 1 to 3, the "number of hits" is given in terms of the number of hits counted before cracks were generated.

As seen from Tables 1, 2 and 3, golf balls according to the examples exhibit excellent durability and shorter time period required for thread winding. By contrast, golf balls manufactured by winding one rubber thread (first, second and fifth comparative examples) take a long time for winding, and golf balls manufactured by winding two rubber threads having no spacing therebetween (third, fourth and sixth comparative examples) exhibit poorer durability.

TABLE 1

| | Examples | | | | |
|---|---|---|---|---|---|
| | 1 | 2 | 3 | 4 | 5 |
| Core | | | | | |
| Type | A | A | A | A | A |
| Diameter(mm) | 31.5 | 31.5 | 31.5 | 31.5 | 31.5 |
| Rubber threads | | | | | |
| Type | X | X | X | Y | Z |
| Breadth(mm) | 1.6 | 1.6 | 1.6 | 1.6 | 1.0 |
| Thickness(mm) | 0.55 | 0.55 | 0.55 | 0.45 | 0.45 |
| Number | 2 | 2 | 2 | 2 | 2 |
| Spacing(mm) | 2 | 3 | 5 | 3 | 3 |
| Wound core | | | | | |
| Diameter(mm) | 40.0 | 39.9 | 40.0 | 40.0 | 39.9 |
| Sphericity(mm) | 0.4 | 0.4 | 0.4 | 0.3 | 0.3 |
| Rubber thread weight(g) | 13.4 | 13.4 | 13.4 | 13.6 | 13.2 |
| Covering material | | | | | |
| Weight(g) | 8.4 | 8.5 | 8.5 | 8.5 | 8.4 |
| Golf ball | | | | | |
| Diameter(mm) | 42.68 | 42.68 | 42.69 | 42.69 | 42.69 |
| Weight(g) | 45.2 | 45.3 | 45.3 | 45.5 | 45.0 |
| Hardness(mm) | 3.00 | 3.05 | 3.02 | 2.98 | 3.10 |
| Normalized winding time | 53 | 53 | 54 | 60 | 89 |
| Impact resilience | | | | | |
| Initial speed(m/s) | 65.5 | 65.4 | 65.5 | 65.4 | 65.4 |
| Durability | | | | | |
| Normalized Durability | 100 | 100 | 100 | 89 | 89 |
| Number of hits before cracks | 170 | 175 | 175 | 170 | 165 |

TABLE 2

| | Comparative Examples | | | |
|---|---|---|---|---|
| | 1 | 2 | 3 | 4 |
| Core | | | | |
| Type | A | A | A | A |
| Diameter (mm) | 31.5 | 31.5 | 31.5 | 31.5 |
| Rubber threads | | | | |
| Type | X | Y | X | Y |
| Breadth (mm) | 1.6 | 1.6 | 1.6 | 1.6 |
| Thickness (mm) | 0.55 | 0.45 | 0.55 | 0.45 |
| Number | 1 | 1 | 2 | 2 |
| Spacing (mm) | — | — | 0 | 0 |
| Wound core | | | | |
| Diameter (mm) | 40.0 | 40.0 | 40.0 | 39.9 |
| Sphericity (mm) | 0.4 | 0.3 | 0.7 | 0.6 |
| Rubber thread weight (g) | 13.1 | 13.4 | 14.0 | 14.1 |
| Covering material | 8.8 | 8.7 | 8.0 | 7.9 |
| Weight (g) | | | | |
| Golf ball | | | | |
| Diameter (mm) | 42.68 | 42.68 | 42.69 | 42.69 |
| Weight (g) | 45.3 | 45.5 | 45.4 | 45.4 |
| Hardness (mm) | 3.00 | 2.95 | 3.08 | 3.05 |
| Normalized winding time | 100 | 102 | 58 | 60 |
| Impact resilience | 65.3 | 65.3 | 65.6 | 65.6 |
| Initial speed (m/s) | | | | |
| Durability | | | | |
| Normalized Durability | 100 | 89 | 67 | 56 |
| Number of hits before cracks | 180 | 170 | 95 | 95 |

TABLE 3

|  | Examples | | Comparative Examples | |
|---|---|---|---|---|
|  | 6 | 7 | 5 | 6 |
| Core | | | | |
| Type | B | B | B | B |
| Diameter (mm) | 28.0 | 28.0 | 28.0 | 28.0 |
| Rubber threads | | | | |
| Type | Y | Y | Y | Y |
| Breadth (mm) | 1.6 | 1.6 | 1.6 | 1.6 |
| Thickness (mm) | 0.45 | 0.45 | 0.45 | 0.45 |
| Number | 2 | 2 | 1 | 2 |
| Spacing (mm) | 2 | 3 | — | 0 |
| Wound core | | | | |
| Diameter (mm) | 40.0 | 40.0 | 39.9 | 40.0 |
| Sphericity (mm) | 0.4 | 0.4 | 0.3 | 0.7 |
| Rubber thread weight (g) | 18.5 | 18.6 | 18.1 | 18.8 |
| Covering material Weight (g) | 8.4 | 8.3 | 8.8 | 8.0 |
| Golf ball | | | | |
| Diameter (mm) | 42.68 | 42.68 | 42.67 | 42.69 |
| Weight (g) | 45.0 | 45.0 | 45.0 | 44.9 |
| Hardness (mm) | 2.85 | 2.80 | 2.82 | 2.90 |
| Normalized winding time | 55 | 53 | 100 | 52 |
| Impact resilience Initial speed (m/s) | 65.4 | 65.4 | 65.2 | 65.6 |
| Durability | | | | |
| Normalized Durability | 100 | 100 | 100 | 56 |
| Number of hits before cracks | 170 | 170 | 175 | 95 |

Since above embodiments are described only for examples, the present invention is not limited to such embodiments and it will be obvious for those skilled in the art that various modifications or alterations can be easily made based on the above embodiments within the scope of the present invention.

We claim:

1. A thread-wound golf ball comprising; a core, said core selected from the group consisting of solid spherical cores made of synthetic rubber and liquid spherical cores which have a spherical rubber bag and a liquid enclosed therein, a single pair of rubber threads concurrently wound around said core, a spacing between said paid of rubber threads being in a range between 1 and 7 mm, and a cover enclosing said pair of rubber threads and said core.

2. A thread-wound golf ball as defined in claim 1 wherein said spacing is in a range between 1 and 5 mm.

3. A thread-wound golf ball as defined in claim 1 wherein said spacing is in a range between 2 and 4 mm.

4. A thread-wound golf ball as defined in claim 1 wherein each of said pair of rubber threads is between 1.0 and 2.5 mm in width and between 0.3 and 0.6 mm in thickness.

5. A thread-wound golf ball as defined in claim 1 wherein said pair of rubber threads forms a rubber layer having a density between 0.76 and 0.92 g/cm$^3$ in a final state thereof.

6. A thread-wound golf ball as defined in claim 1 wherein the crossing angle between the orbits of two consecutive rubber thread turns is within a range of 20–35 degrees.

7. A thread-wound golf ball as defined in claim 1 wherein the expansion ratio of the rubber threads in the final state of the rubber threads is 7–9 times.

8. A thread-wound golf ball comprising; a core, a said core selected from the group consisting of solid spherical cores made of synthetic rubber and liquid spherical cores which has a spherical rubber bag and a liquid enclosed therein, a pair of rubber threads concurrently wound around said core, a spacing between said pair of rubber threads being in a range between 1 and 7 mm, each of said pair of rubber threads is between 1.0 and 2.5 mm in width and between 0.3 and 0.6 mm in thickness, and a cover enclosing said pair of rubber threads and said core.

9. A thread-wound golf ball as defined in claim 8 wherein said pair of rubber threads forms a rubber layer having a density between 0.76 and 0.97 g/cm$^3$ in a final state thereof.

10. A thread-wound golf ball as defined in claim 8 wherein the crossing angle between the orbits of two consecutive rubber thread turns is within a range of 20–35 degrees.

11. A thread-wound golf ball as defined in claim 8 wherein the expansion ratio of the rubber threads in the final state of the rubber threads is 7–9 times.

12. A method for manufacturing a thread-wound golf ball including a step of concurrently winding a pair of rubber threads around a core, said core selected from the group consisting of solid spherical cores made of synthetic rubber and liquid spherical cores which has a spherical rubber bag and a liquid enclosed therein, wherein during said step of winding a spacing between said pair of rubber threads is between 1 and 7 mm on said core.

13. A method for manufacturing a thread-wound golf ball as defined in claim 12 wherein said pair of rubber threads forms a rubber layer having a density between 0.76 and 0.97 g/cm$^3$ in a final state thereof.

14. A method for manufacturing a thread-wound golf ball as defined in claim 12 wherein the crossing angle between the orbits of two consecutive rubber thread turns is within a range of 20–35 degrees.

15. A method for manufacturing a thread-wound golf ball as defined in claim 12 wherein the expansion ratio of the rubber threads in the final state of the rubber threads is 7–9 times.

16. A method for manufacturing a thread-wound golf ball including a step of concurrently winding a pair of rubber threads around a core, said core selected from the group consisting of solid spherical cores made of synthetic rubber and liquid spherical cores which has a spherical rubber bag and a liquid enclosed therein, wherein during said winding step a spacing between said pair of rubber threads is between 1 and 7 mm on said core, each of said pair of rubber threads is between 1.0 and 2.5 mm in width and between 0.3 and 0.6 mm in thickness.

17. A method for manufacturing a thread-wound golf ball as defined in claim 16 wherein said pair of rubber threads forms a rubber layer having a density between 0.76 and 0.97 g/cm$^3$ in a final state thereof.

18. A method for manufacturing a thread-wound golf ball as defined in claim 16 wherein the crossing angle between the orbits of two consecutive rubber thread turns is within a range of 20–35 degrees.

19. A method for manufacturing a thread-wound golf ball as defined in claim 16 wherein the expansion ratio of the rubber threads in the final state of the rubber threads is 7–9 times.

* * * * *